(12) United States Patent
Laarmann et al.

(10) Patent No.: US 11,084,415 B2
(45) Date of Patent: Aug. 10, 2021

(54) SECURING DEVICE AND METHOD OF MANUFACTURING A SECURING DEVICE

(71) Applicant: Jeiko Innovations Oy, Hyvinkää (FI)

(72) Inventors: Elmar Laarmann, Kamara (EE); Mikko Ikonen, Hyvinkää (FI)

(73) Assignee: Jeiko Innovations Oy, Hyvinkää (FI)

( * ) Notice: Subject to any disclaimer, the term of this patent is extended or adjusted under 35 U.S.C. 154(b) by 0 days.

(21) Appl. No.: 16/634,595

(22) PCT Filed: Jul. 13, 2018

(86) PCT No.: PCT/FI2018/050548
§ 371 (c)(1),
(2) Date: Jan. 28, 2020

(87) PCT Pub. No.: WO2019/020866
PCT Pub. Date: Jan. 31, 2019

(65) Prior Publication Data
US 2020/0148093 A1 May 14, 2020

(30) Foreign Application Priority Data

Jul. 28, 2017 (FI) ...................................... 20170113
Oct. 31, 2017 (FI) ...................................... 20175964

(51) Int. Cl.
*B60P 7/08* (2006.01)
(52) U.S. Cl.
CPC ............. *B60P 7/0846* (2013.01); *B60P 7/083* (2013.01)
(58) Field of Classification Search
CPC ............................... B60P 7/0846; B60P 7/083
USPC ....................................................... 410/100
See application file for complete search history.

(56) References Cited

U.S. PATENT DOCUMENTS

| | | | | |
|---|---|---|---|---|
| 5,800,106 A | * | 9/1998 | Miller | B60P 7/0807 24/303 |
| 6,030,158 A | * | 2/2000 | Tatina | B60P 7/135 410/100 |
| 8,458,864 B1 | * | 6/2013 | Patton | B65D 63/10 24/306 |
| 10,258,855 B1 | * | 4/2019 | DiMartino | A63B 67/002 |
| 2005/0286986 A1 | * | 12/2005 | Thomson | B60P 7/15 410/117 |
| 2009/0041557 A1 | | 2/2009 | Lin | |
| 2010/0152635 A1 | * | 6/2010 | Borden | A61F 5/3738 602/4 |
| 2015/0237938 A1 | * | 8/2015 | O'Neill | B60P 7/0823 2/322 |

(Continued)

FOREIGN PATENT DOCUMENTS

| | | |
|---|---|---|
| CN | 105270248 A | 1/2016 |
| DE | 102004050700 A1 | 4/2006 |

(Continued)

*Primary Examiner* — Hilary L Gutman
(74) *Attorney, Agent, or Firm* — Laine IP Oy

(57) ABSTRACT

According to an example aspect of the present invention, there is provided a securing device comprising a strap, a first magnetic member coupled to the strap, a second member which is a magnet or attractable by the first magnetic member and coupled to the strap at a distance from the first magnetic member, and wherein the securing device is configured to hold at least a part of the strap in a specific rolled up storage position by a magnetic field of at least one magnetic member.

8 Claims, 13 Drawing Sheets

(56) References Cited

U.S. PATENT DOCUMENTS

| | | | |
|---|---|---|---|
| 2017/0001552 A1* | 1/2017 | Roe | B60P 3/079 |
| 2021/0016702 A1* | 1/2021 | Huang | B60P 7/0846 |

FOREIGN PATENT DOCUMENTS

| | | | |
|---|---|---|---|
| KR | 2009125030 A * | 12/2009 | |
| KR | 101292810 B1 | 8/2013 | |
| KR | 101495491 B1 | 2/2015 | |
| RO | 121793 B1 * | 4/2008 | |
| WO | WO2006000062 A2 | 1/2006 | |
| WO | WO2013064149 A1 | 5/2013 | |

* cited by examiner

SECURING DEVICE AND METHOD OF MANUFACTURING A SECURING DEVICE

FIELD

The present invention relates to a securing device.

Further, the present invention relates to a method of manufacturing a securing device.

Certain embodiments of the present invention relate to securing devices for the securing of cargo or the securing of an object and, more particularly, to securing devices comprising straps of various types. Certain other embodiments of the present invention relate to an accessory securing device which can be used for equipping an already existing strap.

BACKGROUND

Cargo is often loaded on a storage rack or a transport vehicle. In such cases, it is advantageous to secure the cargo using a securing device. A securing device may, for example, comprise a strap and a hook which is attached to one extremity of the strap.

When cargo is loaded onto a storage rack or a vehicle, for example a conventional freight vehicle, a freight trailer, or a pickup truck, the cargo is often tied down appropriately to ensure the stationary stability of the load to keep the load intact and/or prevent the dropping of the cargo during the shipping process. Instead or in addition to the use of a hook body that can be hitched, inter alia, to the cargo bed rail at at least one end section of the strap, some straps involve the use of a hand-operated pulling device, also called a ratchet strap, to tighten the straps into a holding state, thereby preventing their loosening.

For example, document US 2009/0041557 A1 discloses a hand-operated pulling device hook body retaining structure in which a magnetically attractive mount is fixed onto a pull strap near its hook body. The attachment of the magnetically attractive mount does not affect the pivoting capability of the hook body. A magnetic device is disposed at the inner lateral surface of the magnetically attractive mount that faces the hook body. Furthermore, the magnet permeates the inner side of the hook body and when the pull strap is hitched onto the cargo bed rail of a vehicle, the utilization of the magnet results in attraction between the hand-operated pulling device hook body retaining structure and the bed rail such that the dislodgement and falling off of the hook body does not readily occur, thereby also ensuring that the trussing of the pull strap is simply and efficiently conducted.

When storing a strap after use, and in particular when storing a plurality of straps after use, the material may fasten with a knot or a plurality of knots. Consequently, a user has to take care of the disarrangement prior to further use of the securing device, thus spending time and delaying the securing procedure.

In view of the foregoing, it would be beneficial to provide a securing device by means of which knots and/or any disorder can be prevented during storage of a strap, a ratchet strap, or any securing device comprising a strap.

SUMMARY OF THE INVENTION

The invention is defined by the features of the independent claims. Some specific embodiments are defined in the dependent claims.

According to a first aspect of the present invention, there is provided a securing device comprising a strap, a first magnetic member coupled to the strap, a second member which is a magnet or attractable by the first magnetic member and coupled to the strap at a distance from the first magnetic member, and wherein the securing device is configured to hold at least a part of the strap in a specific rolled up storage position by a magnetic field of at least one magnetic member.

Various embodiments of the first aspect may comprise at least one feature from the following bulleted list:
- the strap is of non-flexible or flexible material
- the strap is configured to be attached to an object by at least one of the first magnetic member and the second member as the securing device is used for securing cargo
- the first magnetic member is attached to a first side of the strap
- the second member is attached to the first side of the strap or to a second side of the strap
- the first magnetic member is embedded in the strap
- the second magnetic member is embedded in the strap
- at least one of the first magnetic member and the second member is arranged in a pouch
- the securing device yet further comprises an attachment means at at least one end section of the strap
- the attachment means is configured to serve as the first magnetic member or as the second member
- the first magnetic member is attached to the attachment means or to the strap
- the first magnetic member is configured to hold the attachment means a specific position relative to an object by a magnetic field of the magnetic member
- at least one of the first magnetic member and the second member is movable along the strap
- the pouch comprises at least one of the first magnetic member and the second member
- the pouch is stitched on a surface of the strap or attached to the strap using Velcro®, i.e. a hook and loop fastener
- the first magnetic member is made of non-flexible or flexible material
- the first magnetic member is made of a flexible magnetic strip or a flexible magnetic band, and wherein the first magnetic member is configured to be embedded in the strap
- wherein the first magnetic member is configured to support rolling up of the strap
- the securing device comprises at least one separate pouch
- a third magnetic member is coupled to the strap adjacent to the first magnetic member
- the third magnetic member is coupled to the strap at a distance of less than 5 cm, preferably less than 3 cm, for example less than 2 cm, to the first magnetic member
- a distance between the first magnetic member and the second member depends on the length of the strap
- the distance between the first magnetic member and the second member increases with increasing length of the strap
- the first magnetic member is arranged less than 10 cm from an end of the first end section of the strap
- the first magnetic member is a disc magnet or in the shape of a block having a rectangular footprint
- the second member is a disc magnet or in the shape of a block having a rectangular footprint
- the third magnetic member is a disc magnet or in the shape of a block having a rectangular footprint
- the securing device comprises a ratchet which is magnetically coupled to at least one magnetic member coupled to the strap the ratchet comprises an opening wing According to a second aspect of the present invention, there is provided a method of manufacturing a securing device, the method comprising providing a strap, coupling a first magnetic member to the strap, coupling a second member which is a magnet or attractable by the first magnetic member to the strap at a distance from the first magnetic member, wherein the securing device is configured to hold at least a part of the strap in a specific rolled up storage position by a magnetic field of at least one magnetic member.

Various embodiments of the second aspect may comprise at least one feature from the following bulleted list:
- a distance between the first magnetic member and the second member is selected based on a length of the strap
- the first magnetic member in the form of a disc magnet or in the shape of a block having a rectangular footprint is coupled to the strap
- the second member in the form of a disc magnet or in the shape of a block having a rectangular footprint is coupled to the strap
- at least one of the first magnetic member and the second member is coupled to the strap such that it is movable along the strap
- a third magnetic member is coupled to the strap adjacent to the first magnetic member
- a ratchet is magnetically coupled to the at least one magnetic member coupled to the strap According to a third aspect of the present invention, there is provided a securing device comprising a first part comprising a first strap, wherein a first attachment means is coupled to the first strap, and at least two magnetic members which are attached to the first strap at a distance to each other, wherein the first part is configured to hold at least a part of the first strap in a specific rolled up storage position by a magnetic field of the at least two magnetic members, and a second part comprising a ratchet which is coupled to a second strap, and a second attachment means coupled to the second strap, and wherein the securing device is capable of magnetically coupling the first part to the second part.

Various embodiments of the third aspect may comprise at least one feature from the following bulleted list:
- the first attachment means and the second attachment means are each in the form of a hook
- the first part is magnetically coupled to a contact surface (18) of the ratchet (17) of the second part
- the ratchet comprises at least one magnet According to a fourth aspect of the present invention, there is provided an accessory comprising a first magnetic member configured to be coupled to the a strap of a securing device, a second member which is a magnet or attractable by the first magnetic member and configured to be coupled to the strap at a distance from the first magnetic member, and wherein the accessory is configured to hold at least a part of the strap in a specific rolled up storage position by a magnetic field of at least one magnetic member.

Various embodiments of the fourth aspect may comprise at least one feature from the following bulleted list:
- each of the first magnetic member and the second member is arranged within a pouch or a holder
- at least one of the first magnetic member and the second member is attachable to the strap using a hook and loop fastener
- at least one of the first magnetic member and the second member is attachable to the strap by using a flexible band
- at least one of the first magnetic member and the second member is attachable to the strap by using a flexible band with a hook and loop fastener portion Considerable advantages are obtained by certain embodiments of the invention. A securing device for securing of cargo or an object is provided. The securing device comprises a strap which can be brought into a specific storage position prior to and after use of the securing system. In particular, the strap of the securing device can be rolled up and kept in the rolled up storage position by a magnetic field of at least one first magnetic member. Thus, knots and/or any other disorder can be prevented during storage of the securing device. The neat roll will prevent unnecessary tear, wear and knotting of the strap when storing it. Thus, time can be saved and the safety is increased.

In the specific storage position, the securing device is further very compact. The rolled up securing device can be, for example, hung up or otherwise stored. No part of the long strap of the securing device can tangle up with a person or an object in the storage position, thus also improving safety. Further, an adequate outer appearance of the securing device is provided in the storage position.

Additionally, the at least one magnetic member can be used to attach the strap of the securing device to another object, for example a vehicle or cargo. This can be beneficial when securing cargo or an object, because falling of an attachment means of the securing device to the ground can be avoided. Thus, a user can also save time when securing cargo or an object. One magnet or more than one magnet coupled to the strap gives additional versatility and more possibilities regarding attachment of the strap to a side of a trailer, for example prior to finishing the securing of cargo, when going to the other side of the trailer or truck to attach the second part of the securing device first to the previously attached strap and then to the second attachment means on the other side.

According to certain embodiments, the at least one magnetic member can be moved along the strap of the securing device. Thus, the position of the magnetic member relative to an object can be adjusted. This is especially beneficial, for example, if only a part of an object is attractable by a magnet. Consequently, it is possible to attach the magnetic member to any surface of an object located along the strap of the securing device, if the object is attractable by the magnetic field of the magnetic member.

Further, the at least one magnetic member may support rolling up of the strap of the securing device according to certain embodiments of the present invention. This may be the case, if e.g. a flexible magnetic band is embedded in the strap of the securing device or if a plurality of magnetic members is placed along the strap of the securing device.

Furthermore, an accessory securing device is provided according to certain embodiments of the present invention. The accessory device does not include the strap as such and is configured to be equipped with already existing straps or securing devices comprising a strap. In this document, also such an accessory device is to be understood as a securing device as the accessory device is configured to secure a strap during storage. The accessory securing device can of course be also used, when equipped with a strap, to attach a strap to another object. In other words, all advantages described above are obtained when equipping a strap or securing device comprising a strap with the accessory securing device.

Additionally, securing devices having a first part and a separate second part are known. According to the present invention, the first part can be mechanically (due to the magnetic attraction) coupled to the first part, thus forming a united 1-piece device for storage of the securing device. The securing device can be stored in a neat way and the risk of losing one of the first part and the second part can be reduced as the parts are stored together due to the magnetic connection. The storage of the securing device in this way prevents unnecessary tear and wear of the strap that may lead further to the prevention of accidents when a poorly stored strap might have some not easily identifiable weak spots/tears that only would show themselves in case of emergency braking or in case of a collision of a vehicle.

Further, for example, by aligning and embedding more weaker magnets within the strap positioned in the way as the present invention proposes or adjusting the strength of the magnets, however being limited in thickness due to the thickness restrictions of the strap of the securing devices "small feeding mouth", the present inventions allows even the previously mentioned neat storage when oftentimes a busy or careless user throws the strap in the back of a trunk or to the floor of the truck without untangling or separation, thus saving time and in the case of 2-piece securing devices preventing the loss of the second part of the strap.

EMBODIMENT S

In this document, the term "storage position" means a position where the securing device is not used for securing cargo, but instead a position where the securing device is stored as such.

Figure 1:
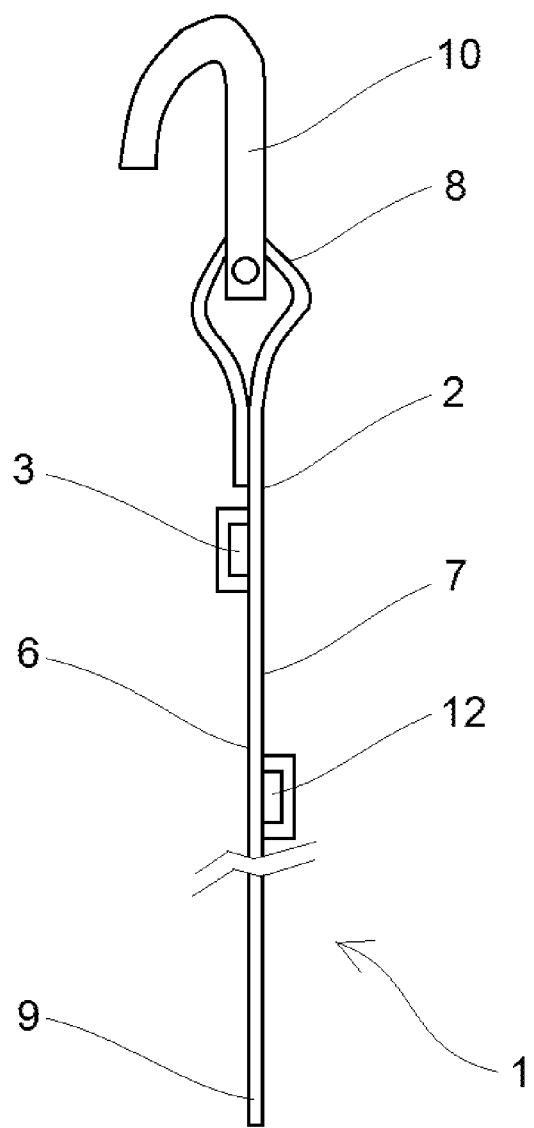
FIG. 1 illustrates a schematic view of a securing device in accordance with at least some embodiments of the present invention.

In FIG. 1 a schematic view of a securing device 1 in accordance with at least some embodiments of the present invention is illustrated. The securing device 1 comprises a strap 2 or belt having a specific length. The strap 2 is coupled at its first end section 8 to a first attachment means 10 in the form of a hook. No further attachment means is coupled to the strap 2 at its second end section 9.

Additionally, a first magnetic member 3 or magnetic element is attached to the strap 2 on a first side 6 of the strap 2. The first magnetic member 3 may be, for example, attached to the strap 2 by a pouch which is connected to the first side 6 of the strap 2, and in which pouch the first magnetic member 3 is arranged. The first magnetic member 3 may be a permanent magnet, for example a neodymium magnet. A further second member 12 is attached to the strap 2 on a second side 7 of the strap 2. The second member 12 may be, for example, attached to the strap 2 by a pouch which is connected to the second side 7 of the strap 2, and in which pouch the second member 3 is arranged. The second member 12 may be another permanent magnet or of a material which is attractable by the first magnetic member 3, for example iron. The first magnetic member 3 and the second member 12 are arranged at a distance to each other.

According to certain embodiments, each member 3, 12 is arranged in one single pouch which can be separately attached to the strap 2 as shown in FIG. 1. According to certain other embodiments, at least two members 3, 12 are arranged in one single pouch which can be attached to the strap 2. In such a case, the members 3, 12 are typically arranged at a distance to each other within the pouch. In both cases, attachment of a pouch to the strap 2 can take place in various ways. For example, a pouch can be stitched on a surface of the strap or attached by using Velcro®, i.e. a hook and loop fastener.

Typically, the strap 2 is a fabric. In some cases, the strap 2 may be non-flexible. In other words, the strap 2 is configured to keep its length or to substantially keep its length, when exerting opposite pulling forces at the first end section 8 and the second end section 9. The change in length of a non-flexible strap is typically less than 2% or as in some standards it is mentioned less than 7%. Other words for such a material behaviour are non-stretchable, non-extendable, or non-elastic. However, in some other cases, the strap 2 may be extendable. In other words, the strap 2 is configured to substantially change its length, when exerting opposite pulling forces at the first end section 8 and the second end section 9. The change in length may be, for example, 5%-700% of the total length of the strap 2, typically 40%-80% of the total length of the strap 2. When stopping exertion of opposite pulling forces at the first end section 8 and the second end section 9, the length of the strap 2 returns to its original length. Other words for such a material behaviour are stretchable, flexible, or elastic.

According to certain embodiments, more than two members 3, 12 are attached to the strap 2. The members can be attached to the first and/or second side 6, 7 of the strap 2. Alternatively, some or all members can be embedded in the strap 2.

Figure 2:
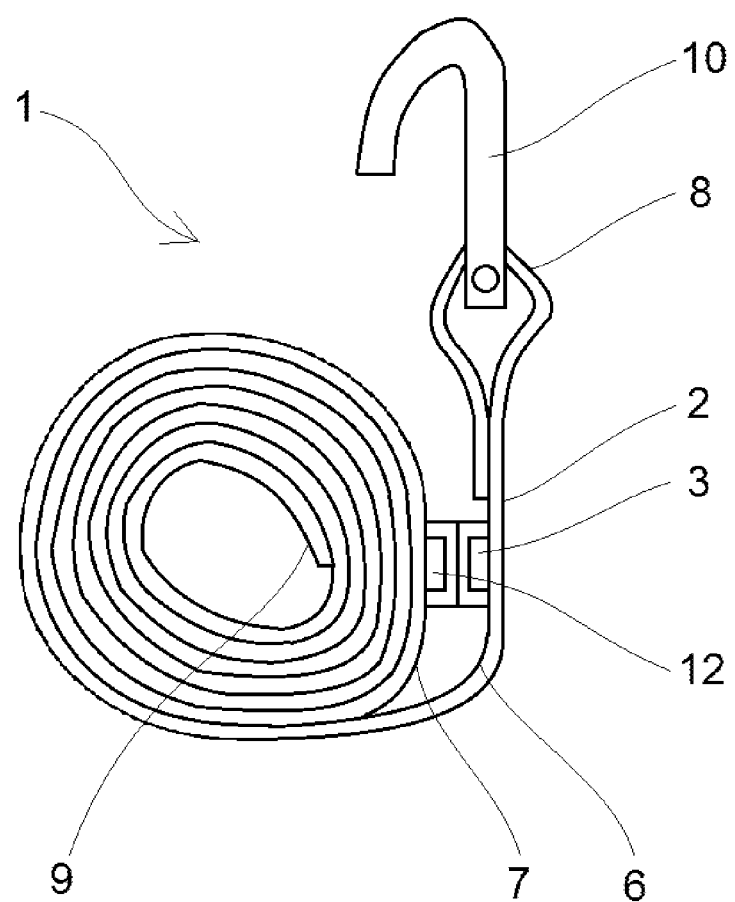
FIG. 2 illustrates a schematic view of another securing device in accordance with at least some embodiments of the present invention.

In FIG. 2 a schematic view of another securing device 1 in accordance with at least some embodiments of the present invention is illustrated. The securing device 1 comprises a strap 2 having a specific length. The strap 2 is coupled at its first end section 8 to a first attachment means 10 in the form of a hook. No further attachment means is coupled to the strap 2 at its second end section 9.

At least a part of the strap 2 is shown in a rolled up position. The securing device 1 further comprises a first magnetic member 3 and a second member 12. The first magnetic member 3 may be a permanent magnet or possibly two magnets combined and the second member 12 may be also a permanent magnet or possibly two magnets combined, for instance. The first magnetic member 3 and the second magnetic member 12 may be, for example, disc magnets. In such a case, the two permanent magnets are orientated such to each other that they are attracted to each other. Preferably, the magnetic member 3 is coupled to the strap 2 on a first side 6 of the strap 2 and the second member 12 is coupled to the strap 2 on a second side 7 of the strap 2. The securing device 1 is configured to hold the strap 2 in a specific rolled up storage position by a magnetic field of the first magnetic member 3 and the second (magnetic) member 12.

Alternatively, the second member 12 is made of a material which is attractable by the first magnetic member 3. In such a case, the securing device 1 is configured to hold the strap 2 in a specific storage position by a magnetic field of the first magnetic member 3.

In general, it does not matter whether the magnetic member 3 or the second member 12 is arranged closer to the first end section 8 of the strap 2. Typically, the first magnetic member 3 is arranged closer to the first end section 8 of the strap 2. The first magnetic member is typically arranged less than 10 cm from an end of the first end section 8 of the strap 2. The distance between the first magnetic member 3 and the second member 12 depends on the length of the strap 2. The distance between the first magnetic member 3 and the second member 12 increases with increasing length of the strap 2. The strap 2 stays in its rolled up storage position due to the interaction of both members 3, 12. Thus, forming of knots can be avoided during storage of the securing device 1, for example in a plastic bag together with other securing devices or in a trunk of a car.

Figure 3:
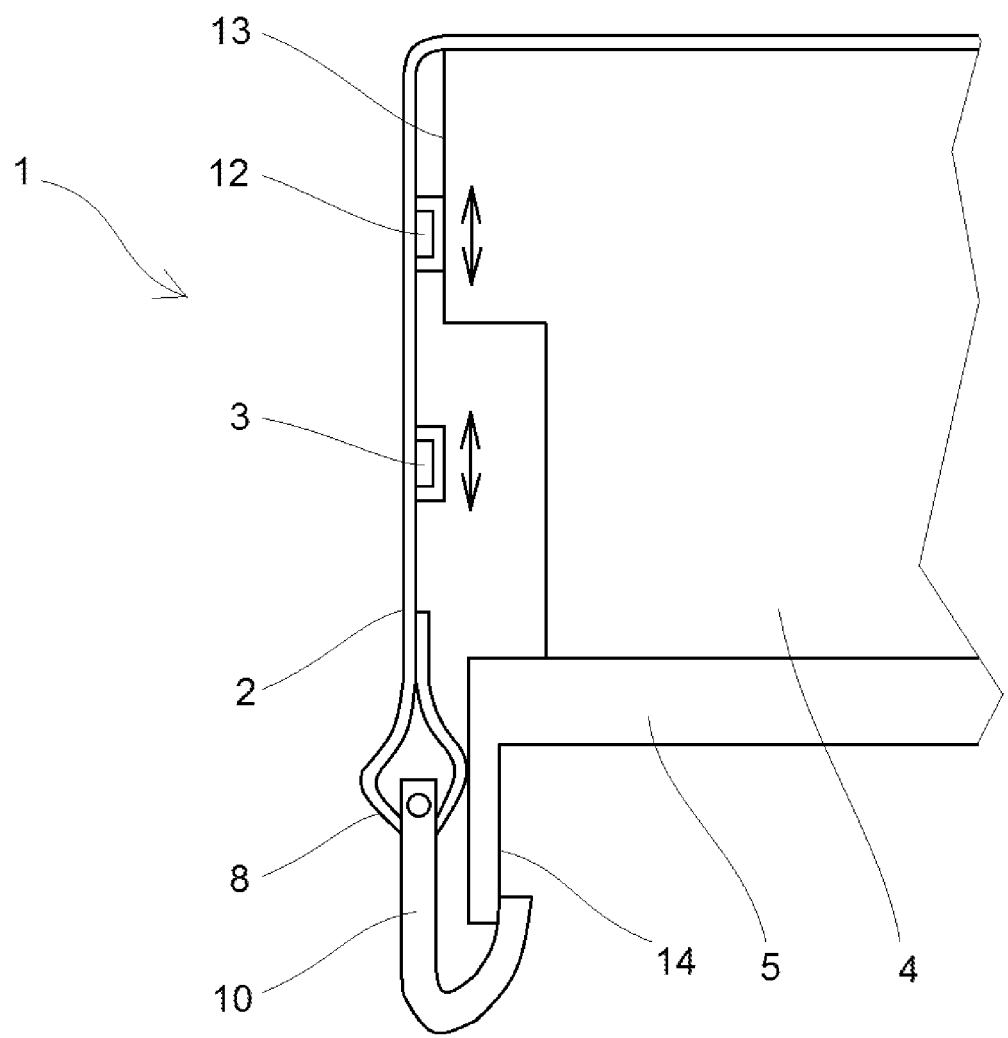
FIG. 3 illustrates a schematic view of a securing device in accordance with at least some embodiments of the present invention during securing cargo.

In FIG. 3 a schematic view of a securing device 1 in accordance with at least some embodiments of the present invention during securing cargo is illustrated. The securing device 1 is used to secure an object 4 on a platform 5, which may be a platform of a storage rack or a vehicle, for instance.

When securing the object 4, a first attachment means 10 in the form of a hook is hooked over an edge 14 protruding from the platform 5. Subsequently, at least one of the first magnetic member 3 and the second member 12 is moved along the strap 2 of the securing device 1 into a position where the respective member 3, 12 can be attached to the object 4 or to the platform 5. Movement of the members 3, 12 is indicated by the arrows.

Thus, the first attachment means 10 stays in its position hooked over the edge 14 of the platform 5, when the strap 2 of the securing device 1 is attached at its second end section (not shown) to the other side of the platform. In other words, the hook 10 cannot fall to the ground when attaching the second end section of the strap 2.

According to certain embodiments, the magnetic member 3 can be moved along the strap 2 such that the first magnetic member 3 can be attached to the platform 5 or to the object 4. Due to the movability of the first magnetic member 3 along the strap 2, the magnetic member 3 can be attached to any suitable surface 13. This is particularly beneficial, because only a part of some platforms 5 and/or a part of some objects 4 may be suitable to result in attraction between a magnet and the respective part. The movability of the first magnetic member 3 ensures that the position of the first magnetic member 3 can be selected in dependence of a surface 13 suitable for resulting in attraction between a magnet and the respective surface 13. In case that the second member 12 also includes a magnet, also the second member 12 may be movable along the strap 2 in order to select a suitable position for the second member 12.

At least one of the first magnetic member 3 and the second member 12 is configured to hold the attachment means 10 in a specific position relative to an object by a magnetic field of the first magnetic member 3 and the second member 12, respectively.

According to certain embodiments, the attachment means 10, for example in the form of a hook, may instead of or in addition to the first magnetic member 3 be of magnetic material. Thus, the securing device 1 can easily stay in its position during use of the securing device 1. In such a case, the securing device 1 may also be configured to hold at least a part of the strap 2 in a specific storage position by a magnetic field of the hook 10. In other words, an attachment means 10, for example in the form of a hook, can serve as the first magnetic member 3 in some cases. Of course, a first magnetic member 3 may also be instead attached to the attachment means 10 and not to the strap 2 in order to provide a magnetic field directly in the area of the attachment means 10. A magnetic member can be attached to the strap 2 and/or to the attachment means 10 according to certain embodiments of the present invention. Further, the attachment means 10, for example in the form of a hook, can also serve as a second member which is attractable by a first magnetic member 3. In all aforementioned cases, the strap 2 can be of flexible material or non-flexible material.

Figure 4:
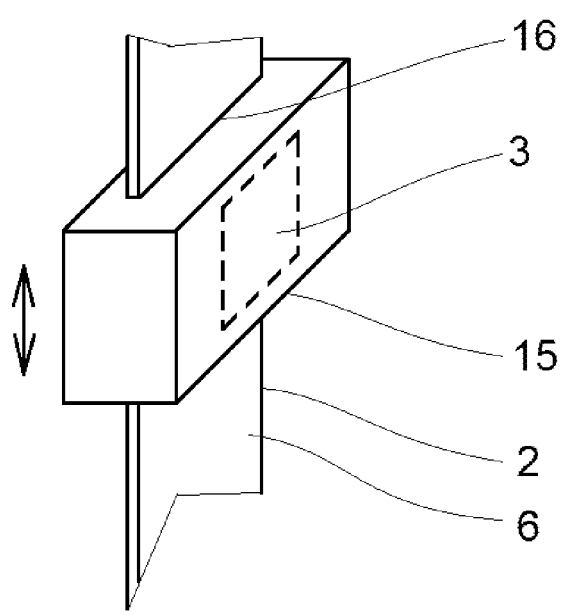
FIG. 4 illustrates a detail of a securing device in accordance with at least some embodiments of the present invention.

In FIG. 4 a detail of a securing device 1 in accordance with at least some embodiments of the present invention is illustrated. A part of a strap 2 of a securing device 1 is shown. The strap 2 is made of a fabric. Further, a magnetic member 3 is embedded in a pouch 15. The pouch may be, for example, of a fabric. The pouch 15 comprises an opening 16 through which the strap 2 can be guided. Thus, it is possible to move the first magnetic member 3 along the strap 2 in both directions as indicated by the arrows. The pouch 15 may be attached to the strap 2 using Velcro® fasteners, for instance.

Of course, the first magnetic member 3 may be embedded in or attached to another device than a pouch. Such a device may be of flexible or solid material. For example, the first magnetic member 3 may be embedded in or attached to a plastic body. It is only required that the first magnetic member 3 can be moved along the strap 2 in order to adjust the position of the first magnetic member 3 relative to an object (not shown) such that this results in magnetic attraction between the first magnetic member 3 and the object.

Accordingly, also the second member may be movable along the strap 2 in order to adjust the position of the second member relative to the attachment means.

According to certain embodiments of the present invention, an accessory device is provided. Such an accessory device does not include the strap 2. The accessory device comprises at least one of the first magnetic member 3 and the second member 12. Each member 3, 12 may be, for example, embedded in a pouch 15 made of fabric. The respective pouch 15 may comprise Velcro® fasteners in order to attach the pouch 15 to a strap 2, for instance. Such an accessory device can be used in order to equip existing straps 2 or securing devices comprising a strap at a later stage.

Figure 5:
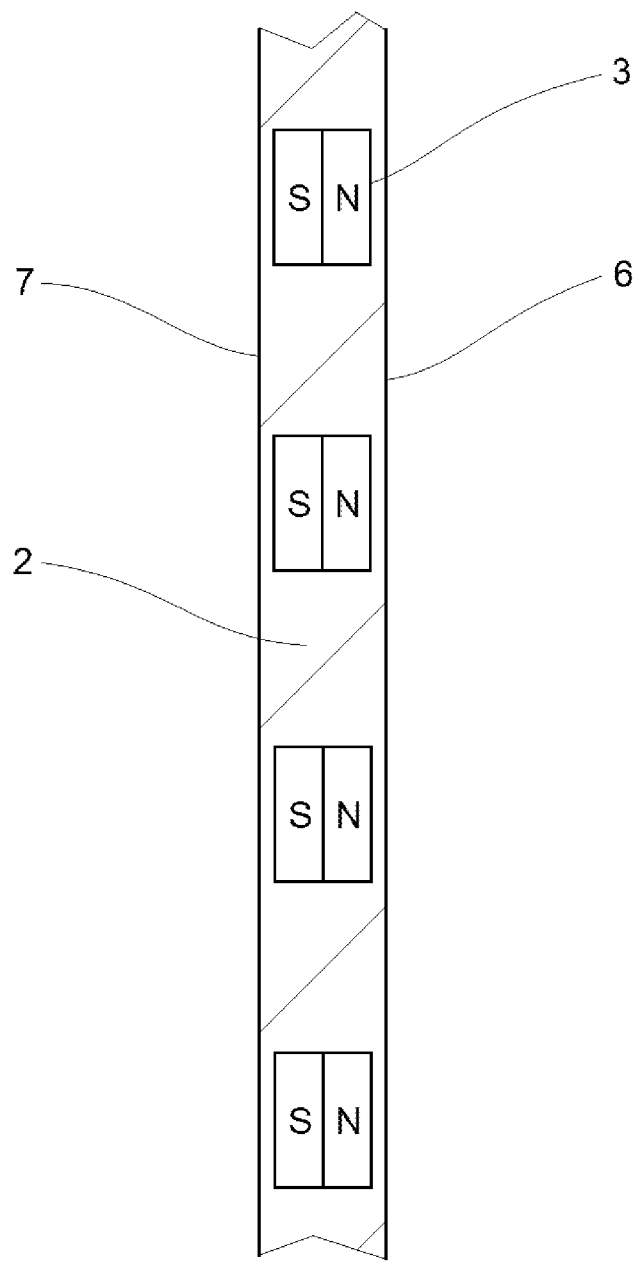
FIG. 5 illustrates a cross-sectional view of a part of a strap of a securing device in accordance with at least some embodiments of the present invention.

In FIG. 5 a cross-sectional view of a part of a strap 2 of a securing device 1 in accordance with at least some embodiments of the present invention is illustrated. A plurality of first magnetic members 3 and second (magnetic) members is embedded in the strap 2. The number of first magnetic members and second (magnetic) members may be any integer number, for example 4 or 8. Each first magnetic member 3 is orientated such that the North-pole is facing towards the first side 6 of the strap 2 and the South-pole is facing towards the second side 7 of the strap 2. In case that the second members are also magnets, the second members are oriented in an identical way. The first magnetic members 3 and the second (magnetic) members are arranged at a distance to each other. Such an orientation of the first magnetic members 3 is required to provide a North-pole adjacent to a South-pole as the strap 2 is in its rolled up storage position (not shown). Each first magnetic member 3 is of stiff or non-flexible material. Each second (magnetic) member is also of stiff or non-flexible material In this document, the term "stiff" means that the first magnetic member 3 cannot be manually bent or twisted. However, the strap 2 is made of flexible material, for example a fabric. Thus, it is possible to roll up the strap 2 into its specific storage position after use of the securing device 1.

Figure 6:
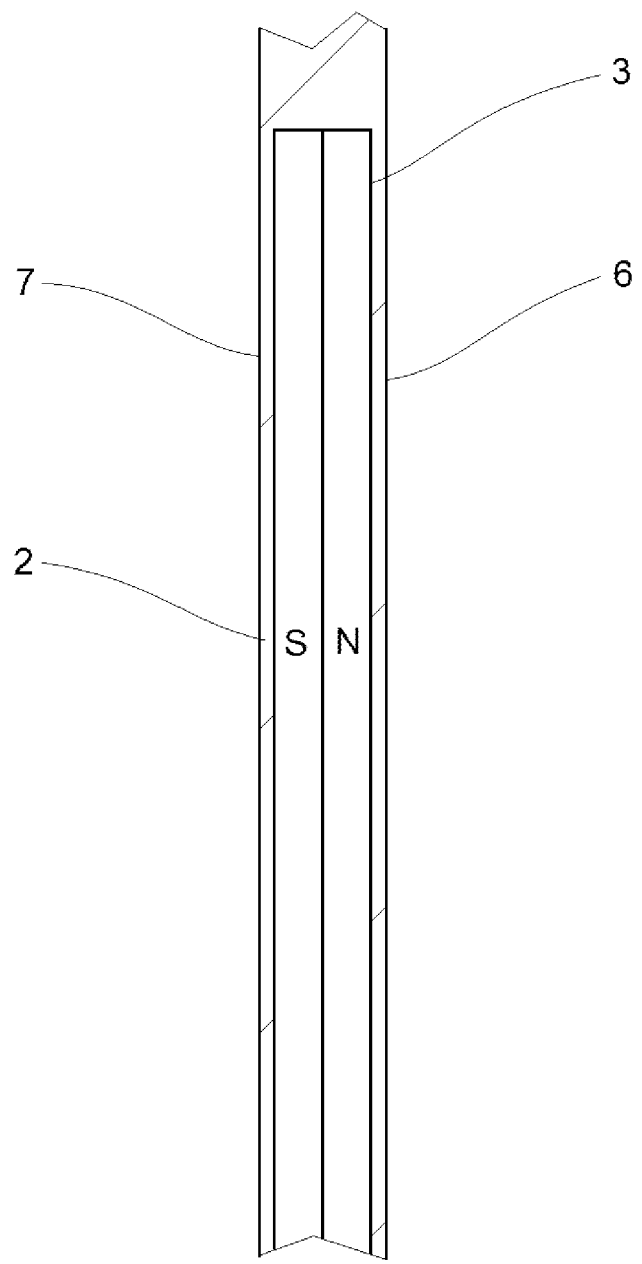
FIG. 6 illustrates a cross-sectional view of a part of another strap of a securing device in accordance with at least some embodiments of the present invention.

In FIG. 6 a cross-sectional view of a part of another strap of a securing device in accordance with at least some embodiments of the present invention is illustrated. A single magnetic member 3 is embedded in the strap 2. The first magnetic member 3 is in the form of a flexible magnetic strip or flexible magnetic band. The term "flexible" means that the magnetic material of the magnetic member 3 can be bent, twisted, and coiled. The first magnetic member 3 is orientated such that the North-pole is facing towards the first side 6 of the strap 2 and the South-pole is facing towards the second side 7 of the strap 2. As the first magnetic member 3 is of flexible material, the magnetic member is bendable, and thus it is possible to roll up the strap 2 into its specific storage position after use of the securing device 1. When rolling up the strap 2 into its storage position (not shown), a North-pole is always arranged adjacent to a South-pole. Of course, the securing device may also comprise a plurality of flexible first magnetic members 3 instead of one single flexible first magnetic member 3. Additionally, further flexible second members (not shown) which are attractable by the first magnetic members 3 may be arranged between two first magnetic members 3. The flexible magnetic material of the first magnetic member 3 may be embedded in the strap 2 along the whole length of the strap or only a part of it. The strength of the magnetic field of the magnetic member(s) may differ in different parts of the strap 2. Typically, the magnetic member 3 also supports rolling up the strap 2. In case that only one magnetic member 3 is used, the attachment means (not shown) may serve as the second member.

Alternatively, the flexible magnetic strip or flexible magnetic band may also be attached to the strap 2 using Velcro® fasteners (not shown) instead of being embedded in the strap 2.

According to certain embodiments of the present invention, an accessory device is provided. Such an accessory device does not include the strap 2. The accessory device comprises at least one first magnetic member 3. The magnetic member 3 may be in the form of a magnetic strip or magnetic band. The magnetic member 3 may be, for example, configured to be attached to an existing strap 2 using Velcro® fasteners, for instance. Such an accessory device can be used in order to equip existing straps 2 or securing devices comprising a strap at a later stage.

Figure 7:
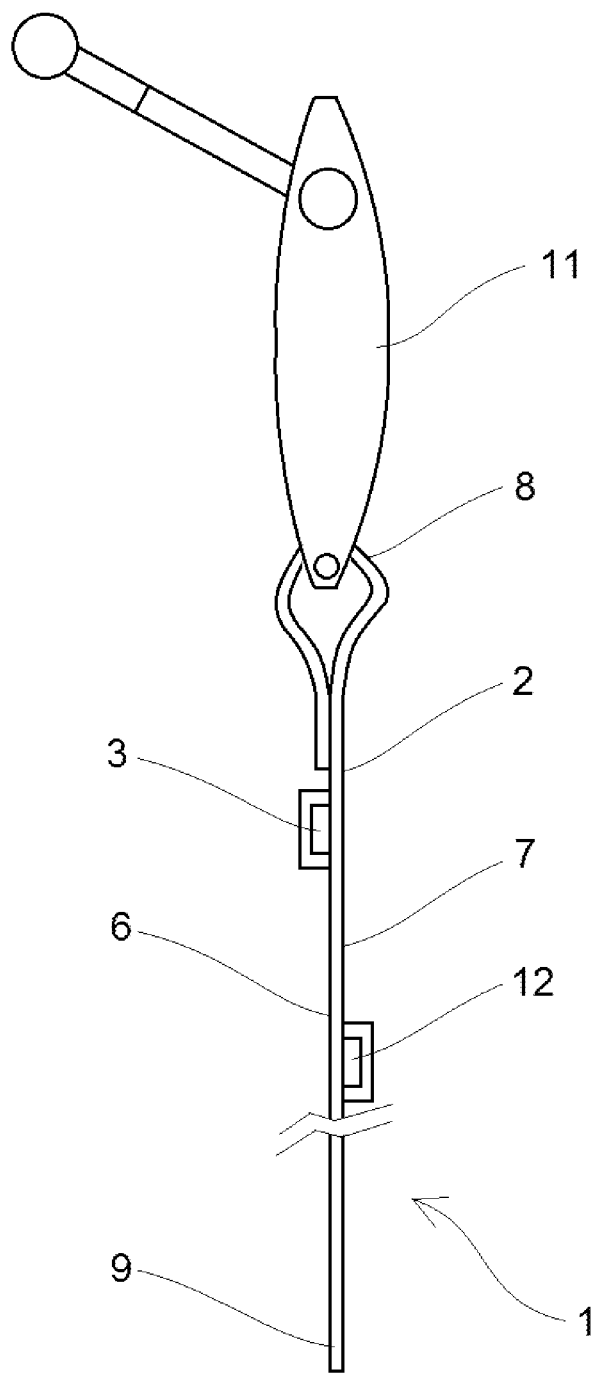
FIG. 7 illustrates a schematic view of a further securing device in accordance with at least some embodiments of the present invention.

In FIG. 7 a schematic view of a further securing device 1 in accordance with at least some embodiments of the present invention is illustrated. Contrary to the securing device 1 shown in FIG. 1, a second attachment means 11 in the form of a hand-operated pulling device is coupled to the strap 2 at its first end section 8. The pulling device 11 can be used to fasten the strap 2 in order to secure cargo. Such a securing device is also called a ratchet strap and comprises a ratchet, a strap, and at least one first magnetic member and a second member 12. Various other attachment means, for example clips or clamps, can be used in accordance with the present invention.

Figure 8:
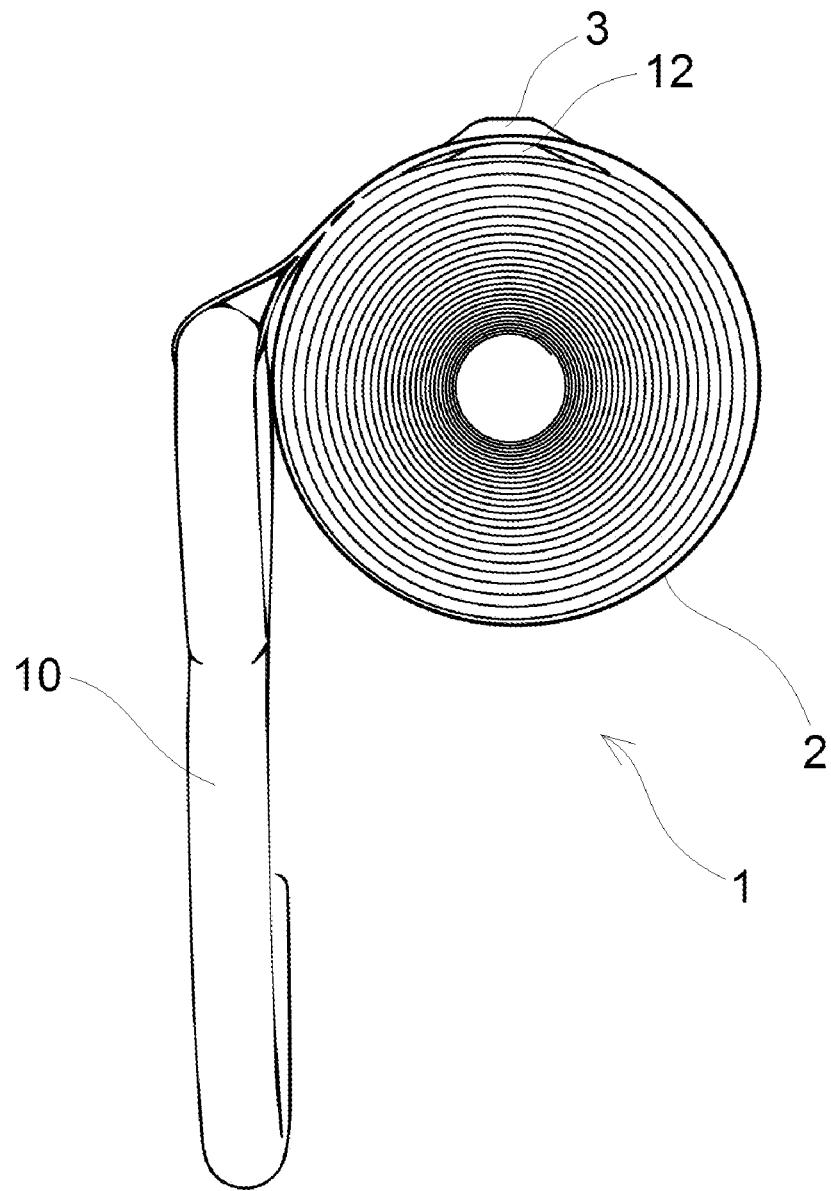
FIG. 8 illustrates a schematic view of a yet further securing device in accordance with at least some embodiments of the present invention.

In FIG. 8 a schematic view of a yet further securing device 1 in accordance with at least some embodiments of the present invention is illustrated. The strap 2 of the securing device 1 is shown in its rolled-up storage position. The securing device further comprises a first magnetic member 3 coupled to the strap 2. The magnetic member 3 is attached to the strap 2 on one side of the strap 2. Additionally, the securing device 1 comprises a second magnetic member 12. The second magnetic member 12 is coupled to the strap 2 at a distance from the first magnetic member 3 on the same side of the strap 2 as the first magnetic member 3. The securing device 1 is configured to hold at least a part of the strap 2 in the specific rolled up storage position by a magnetic field of the magnetic members 3, 12.

According to certain embodiments, more than two magnetic members may be attached to the strap 2. Thus, the magnetic field strength can be increased when the magnetic members are aligned with each other in the rolled up position.

Figure 9:
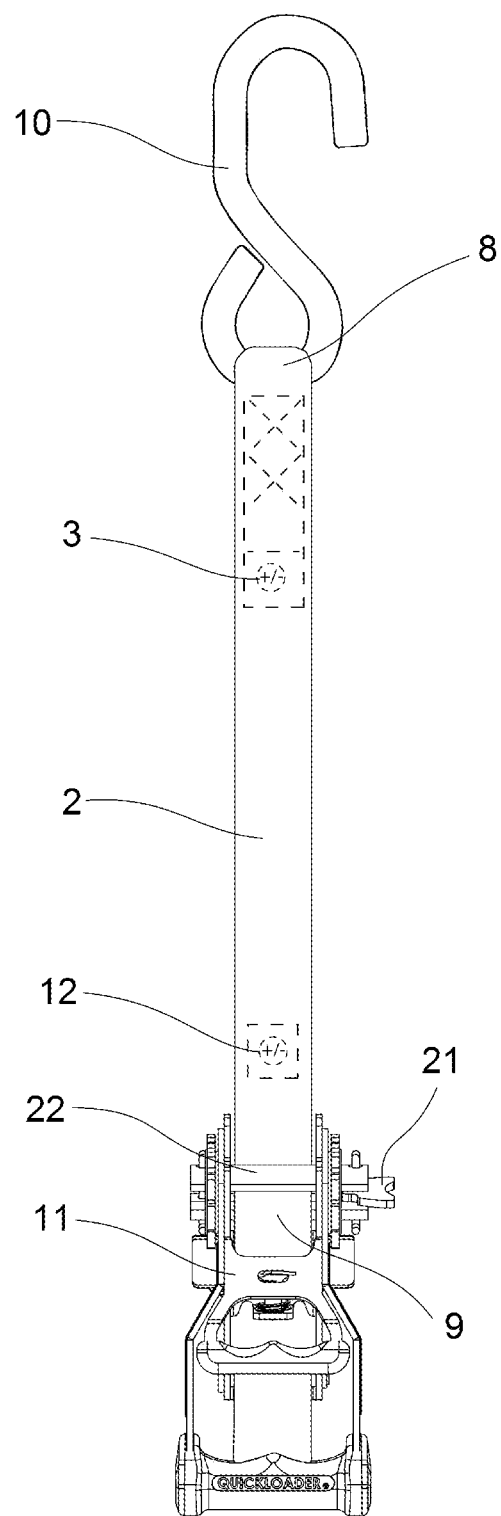
FIG. 9 illustrates a schematic view of an even further securing device in accordance with at least some embodiments of the present invention.

In FIG. 9 a schematic view of an even further securing device 1 in accordance with at least some embodiments of the present invention is illustrated. The securing device 1 comprises a strap 2. A first magnetic member 3 and a second magnetic member 12 are attached to the strap 2 and arranged at a distance to each other. The distance between the first magnetic member 3 and the second magnetic member 12 depends on the total length of the strap 2. The distance is selected such that the magnetic members are substantially at the same position when the strap is in its rolled up position.

According to certain embodiments, a third magnetic member (not shown) may be arranged adjacent to the first magnetic member 3 or the second magnetic member 12. Typically, the third magnetic member is arranged adjacent to the first magnetic member at one end of the strap 2. Therefore, the end of the strap 2 is stiffer than the rest of the strap 2, and thus, the outer appearance of the rolled up strap is more acceptable. Additionally, as the dimensions of the rolled up strap 2 may vary slightly depending on how a user rolls up the strap 2, the second magnetic member 12 is more likely at the same position as the first magnetic member 3 or the third magnetic member. Of course, the second magnetic member 12 may also overlap with the first magnetic member 3 and the third magnetic member. The first magnetic member 3, the second magnetic member 12 and the third magnetic member may be, for example, a disc magnet, in the shape of a block having a rectangular footprint or formed as a square or in any other suitable shape. Examples of suitable magnets are a neodymium magnet, a ferromagnet or other magnets. Neodynium magnets are beneficial, because commercially available neodymium magnets can be very thin, and thus the magnets attached to the strap can be fed through an opening of a ratchet "mouth".

The shown securing device 1 further includes a first attachment means in the form of a hook at a first end section 8 of the strap 2 and a ratchet 11 at a second end section 9 of the strap 2. The ratchet 17 further comprises a so called opening wing 21. The opening wing 21 can be used for manually releasing/rotating the axis 22 of the ratchet through which the strap 2 is fed.

Figure 10:
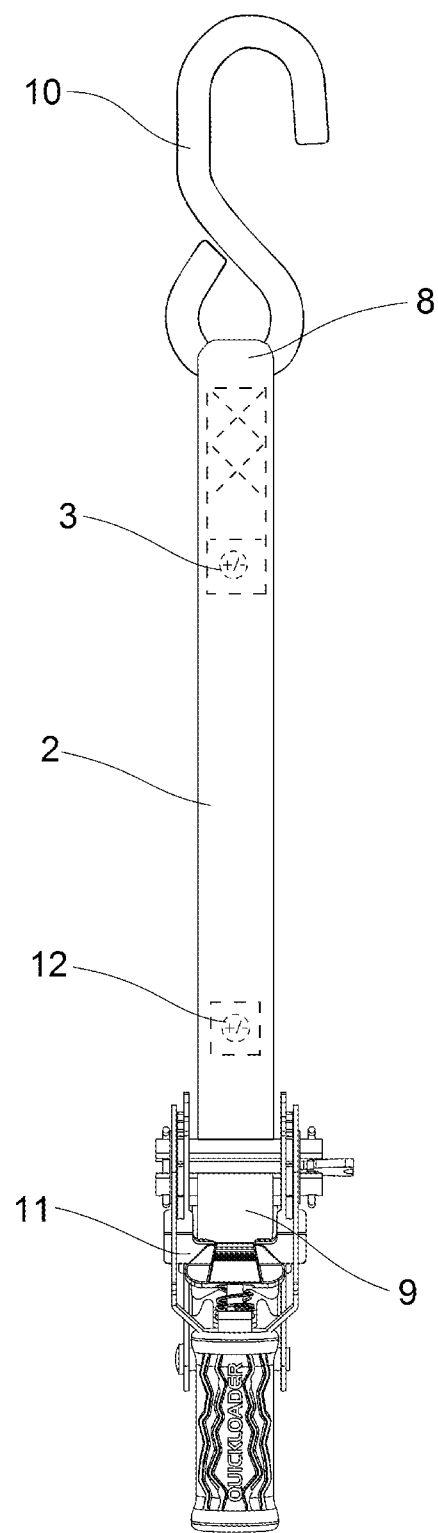
FIG. 10 illustrates a schematic view of another securing device in accordance with at least some embodiments of the present invention.

In FIG. 10 a schematic view of another securing device 1 in accordance with at least some embodiments of the present invention is illustrated. The shown securing device 1 further includes a first attachment means in the form of a hook at a first end section 8 of the strap 2 and another ratchet 11 at a second end section 9 of the strap 2

Figure 11:
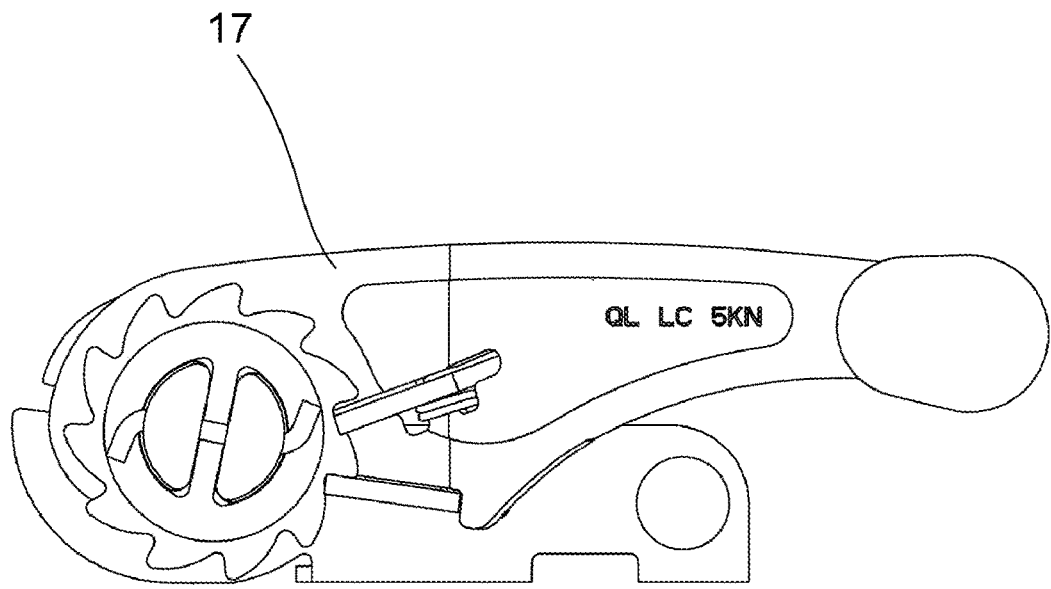
FIG. 11 illustrates a schematic view of a ratchet configured to be used in connection with a securing device in accordance with at least some embodiments of the present invention.

In FIG. 11 a schematic view of a ratchet 17 configured to be used in connection with a securing device 1 in accordance with at least some embodiments of the present invention is illustrated. The ratchet 17 comprises at least a part or section which is attractable by at least one magnetic member 3, 12. Thus, the ratchet 17 can be magnetically coupled to the rolled up strap 2 after and before use of the securing device. All parts of the securing device can be mechanically and/or magnetically coupled to each other. The magnetic force of the at least one magnetic member 3, 12 is sufficient to hold the ratchet 17 in position even when the securing device 1 is hanging, for example at a wall as shown in FIG. 13.

Figure 12:
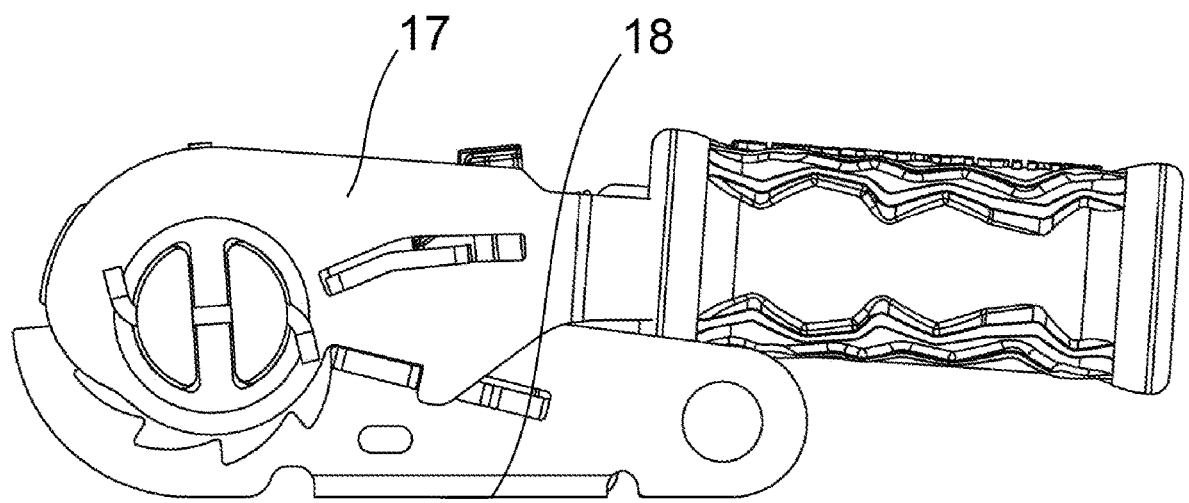
FIG. 12 illustrates a schematic view of another ratchet configured to be used in connection with a securing device in accordance with at least some embodiments of the present invention.

In FIG. 12 a schematic view of another ratchet 17 configured to be used in connection with a securing device 1 in accordance with at least some embodiments of the present invention is illustrated. The ratchet 17 comprises at least a part or section which is attractable by at least one magnetic member 3, 12. Thus, the ratchet 17 can be magnetically coupled to the rolled up strap 2 after and before use of the securing device. All parts of the securing device can be mechanically and/or magnetically coupled to each other. The magnetic force of the at least one magnetic member 3, 12 is sufficient to hold the ratchet 17 in position even when the securing device 1 is hanging, for example at a wall as shown in FIG. 13. The ratchet 17 includes a coupling portion with a metallic coupling surface 18 to which the rolled up strap 2 can be magnetically coupled. Of course, the coupling portion of the ratchet may also comprise a magnet. A small opening (not shown) may be provided in the coupling surface 18 so that the magnetic member of the rolled up strap can be positioned in the area of the opening.

Figure 13:
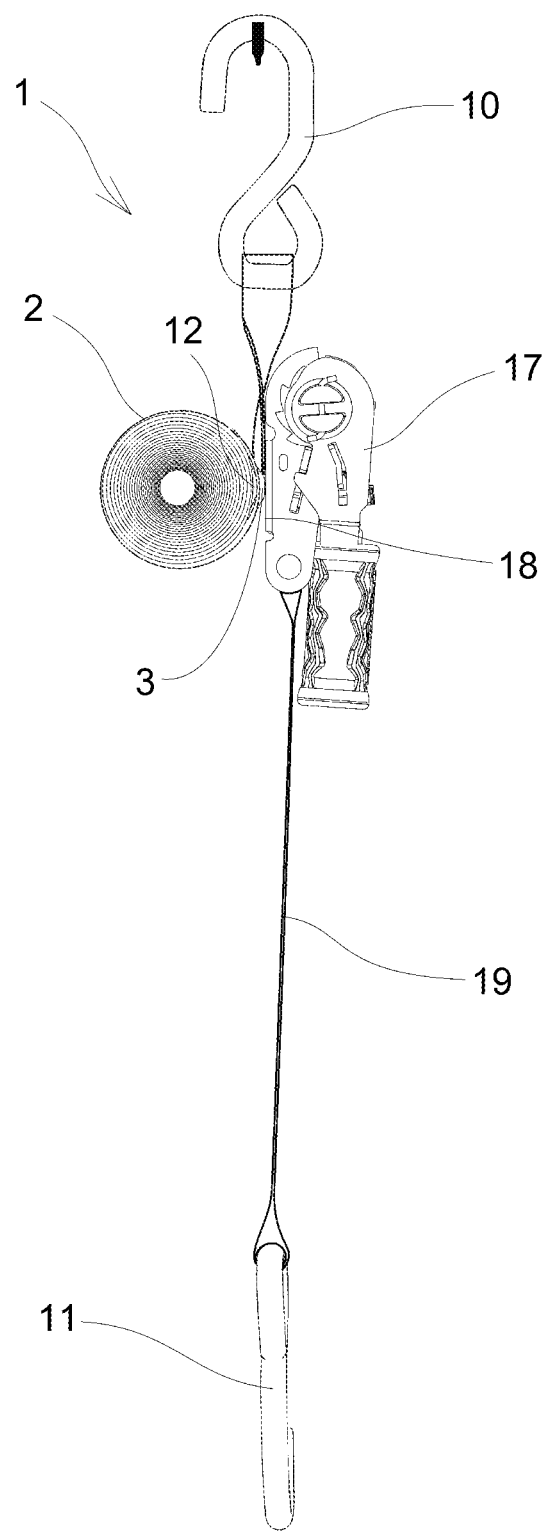
FIG. 13 illustrates a schematic view of a securing device in accordance with at least some embodiments of the present invention.

In FIG. 13 a schematic view of a securing device in accordance with at least some embodiments of the present invention is illustrated. The securing device 1 is hanging at a wall from a nail or the like. The securing device 1 comprises two different parts. The first part of the securing device 1 comprises a first attachment means 10 in the form of a hook which is connected to a rolled up strap 2. The strap 2 is held in its rolled up storage position by two neodymium magnets which are attached to the strap 2. The second part of the securing device comprises a ratchet 17 which is connected to a relatively short second strap 19 at one end of the second strap 19. At the other end of the second strap 19 a second attachment means 11 in the form of a hook is connected. The first part and the separate second part are connected to each other. In particular, the ratchet 17 is magnetically coupled to the magnets attached to the rolled up strap 2. Thus, the separate first part and the second part of the securing device 1 form a united single part for storage of the securing device. The first part and the second part are in contact with each other mechanically due to the magnetic attraction. Typically, a part of the rolled up strap 2 touches the contacting surface 18 of the ratchet 17. A user can store the securing device 1 in a very neat way after use. Further, as the first part and the second part of the securing device 1 are mechanically coupled together, it is not possible that one of the parts gets unintentionally lost.

The magnetic force exerted by the magnets is sufficient to hold the complete second part of the securing device 1 in position. The magnets are selected depending on the dimensions of the securing device 1. The magnetic field strength of the magnets is typically capable of holding a second part having a mass of up to 7 kg. The magnetic field strength can be varied by selecting suitable magnets and by selecting the number of magnets. In the shown embodiment, two magnets are aligned with each other. However, more than two magnets can be aligned with each other to increase the force exerted by the magnets. Examples of magnets to be used are neodymium magnets in the form of a square with a magnetic flux density (magnetic field strength) of up to 1 T.

Figure 14:
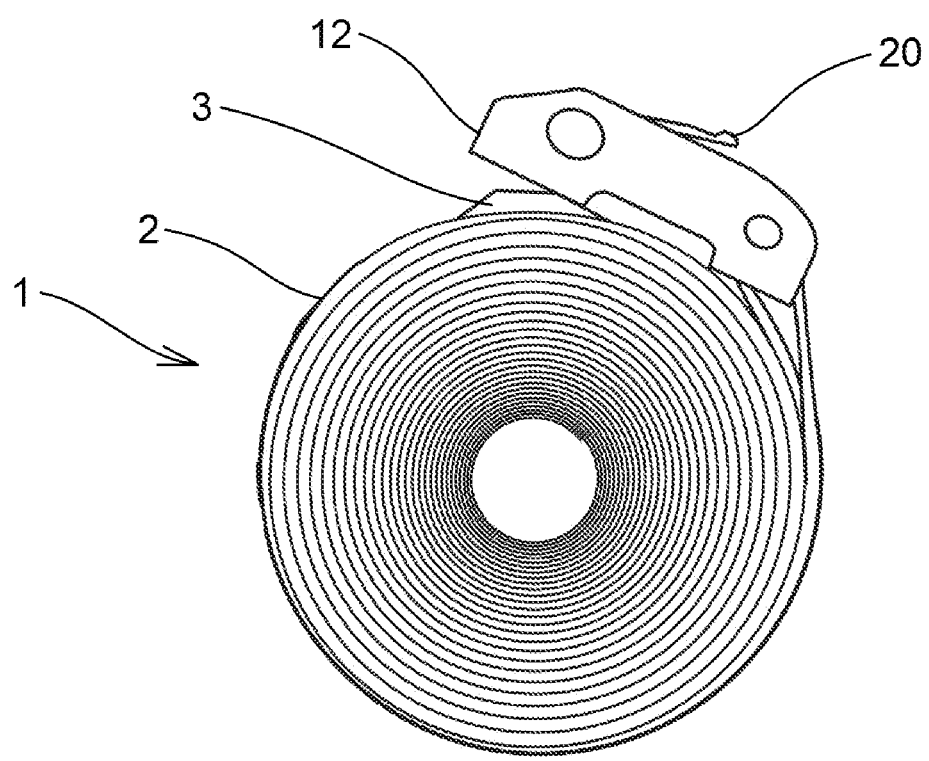
FIG. 14 illustrates a schematic view of a further securing device in accordance with at least some embodiments of the present invention.

In FIG. 14 a schematic view of a further securing device 1 in accordance with at least some embodiments of the present invention is illustrated. The securing device 1 comprises a strap 2 to which a so called cambuckle 20 is coupled at one end of the strap 2. Additionally, a first magnetic member 3 is coupled to the strap 2. No further members are coupled to the strap 2. In the shown embodiment, the cambuckle 20 serves as the second member 12. The cambuckle 20 is of metallic material and attractable by the first magnetic member 3. The securing device 1 is configured to hold at least a part of the strap 2 in a specific rolled up storage position by a magnetic field of only the first magnetic member 3.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in securing cargo.

REFERENCE SIGNS LIST 1 securing device
2 strap
3 first magnetic member
4 object
5 platform
6 first side
7 second side
8 first end section
9 second end section
10 first attachment means
11 second attachment means
12 second member
13 surface
14 edge
15 pouch
16 opening
17 ratchet
18 coupling surface
19 second strap
20 cambuckle
21 opening wing
22 axis

CITATION LIST

Patent Literature

US 2009/0041557 A1

Non Patent Literature

The invention claimed is:

1. A securing device comprising:
    a first part comprising:
        a first strap, wherein a first attachment means in the form of a first hook is coupled to the first strap, and
        at least two magnetic members which are attached to the first strap at a distance to each other,
        wherein the first part is configured to hold at least a part of the first strap in a specific rolled up storage position by a magnetic field of the at least two magnetic members,
    a second part comprising:
        a ratchet which is coupled to a second strap at its first end, and
        a second attachment means in the form of a second hook coupled to the second strap at its second end,
    and wherein the first part is configured to be magnetically coupled to the second part such that a magnetic field strength of the at least two magnetic members is capable of holding the second part in position in relation to the first part when the securing device is hanging at its first hook.

2. The securing device according to claim 1, wherein the first part is magnetically coupled to a contact surface of the ratchet of the second part.

3. The securing device according to claim 1, wherein the ratchet comprises at least one magnet.

4. The securing device according to claim 1, wherein the at least two magnetic members are neodymium magnets.

5. The securing device according to claim 1, wherein the securing device comprises neodymium magnets in the form of a square with a magnetic flux density of up to 1 T.

6. The securing device according to claim 1, wherein more than two magnetic members in the form of magnets are aligned with each other to increase the force exerted by the magnets.

7. The securing device according to claim 1, wherein the first part and the second part form a united single piece unit when the first part is magnetically coupled to the second part.

8. The securing device according to claim 1, wherein the magnetic field strength of the at least two magnetic members in the form of magnets is capable of holding in position the second part having a mass of up to 7 kg.

* * * * *